United States Patent
Hirasawa et al.

(10) Patent No.: US 8,657,971 B2
(45) Date of Patent: Feb. 25, 2014

(54) BRAKE DISK EXCELLENT IN TEMPER SOFTENING RESISTANCE AND TOUGHNESS

(75) Inventors: Junichiro Hirasawa, Hiroshima (JP); Takumi Ujiro, Chiba (JP); Osamu Furukimi, Fukuoka (JP)

(73) Assignee: JFE Steel Corporation (JP)

( * ) Notice: Subject to any disclaimer, the term of this patent is extended or adjusted under 35 U.S.C. 154(b) by 321 days.

(21) Appl. No.: 12/297,099

(22) PCT Filed: Oct. 5, 2006

(86) PCT No.: PCT/JP2006/320364
§ 371 (c)(1),
(2), (4) Date: Nov. 17, 2008

(87) PCT Pub. No.: WO2008/044299
PCT Pub. Date: Apr. 17, 2008

(65) Prior Publication Data
US 2009/0104068 A1  Apr. 23, 2009

(51) Int. Cl.
*C22C 38/20* (2006.01)
*C22C 38/26* (2006.01)
(52) U.S. Cl.
USPC ............... 148/326; 148/325; 420/60; 420/64
(58) Field of Classification Search
USPC ............ 148/325, 326; 420/34, 60, 61, 64, 68, 420/69
See application file for complete search history.

(56) References Cited

U.S. PATENT DOCUMENTS

| 4,452,649 | A | 6/1984 | Yoshioka et al. |
| 2004/0096352 | A1 | 5/2004 | Ozaki et al. |

FOREIGN PATENT DOCUMENTS

| EP | 1621644 | * | 2/2006 |
| JP | 57-198249 | A | 12/1982 |
| JP | 60-106951 | A | 6/1985 |
| JP | 2-111846 | A | 4/1990 |
| JP | 2001-192779 | A | 7/2001 |
| JP | 2001-220654 | A | 8/2001 |
| JP | 2002-121656 | A | 4/2002 |
| JP | 2002-146489 | A | 5/2002 |
| JP | 2003-73743 | A | 3/2003 |
| JP | 2005-133204 | A | 5/2005 |
| JP | 2006-291240 | A | 10/2006 |

OTHER PUBLICATIONS

Machine-English translation of Japanese patent 2005-133204, Hirasawa Junichiro et al., May 26, 2005.*
Machine-English translation of Japanese patent 2001-192779, Takashashi Akihiko et al., Jul. 17, 2001.*

* cited by examiner

*Primary Examiner* — Deborah Yee
(74) *Attorney, Agent, or Firm* — DLA Piper LLP (US)

(57) ABSTRACT

A brake disk excellent in temper softening resistance and toughness comprising, by mass, 0.1% or less of C, 1.0% or less of Si, 2.0% or less of Mn, 10.5% to 15.0% of Cr, and 0.1% or less of N, the remainder being Fe and unavoidable impurities, such that the following inequalities are satisfied: $5Cr+10Si+15Mo+30Nb-9Ni-5Mn-3Cu-225N-270C<45$ (1) and $0.03 \leq \{C+N-(13/92)Nb\} \leq 0.09$ (2) wherein Cr, Si, Mo, Nb, Ni, Mn, Cu, N, and C each represent the content of the corresponding elements on a mass percent basis, and having a martensitic structure having prior-austenite grains with an average diameter of 8 to less than 15 μm.

5 Claims, 1 Drawing Sheet

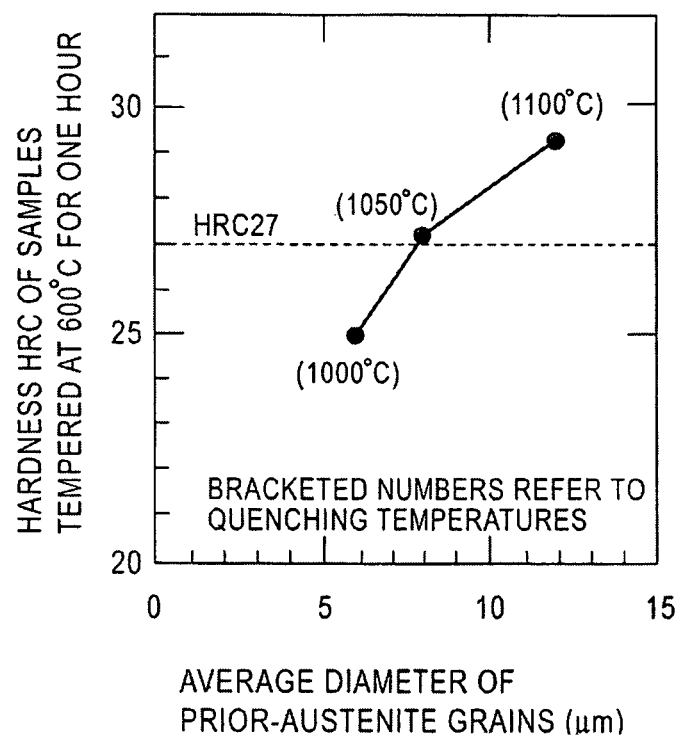

BRAKE DISK EXCELLENT IN TEMPER SOFTENING RESISTANCE AND TOUGHNESS

RELATED APPLICATIONS

This is a §371 of International Application No. PCT/JP2006/320364, with an international filing date of Oct. 5, 2006 (WO 2008/044299 A1, published Apr. 17, 2008).

TECHNICAL FIELD

This disclosure relates to disks used for disc brakes for motorcycles, motorcars, bicycles, and the like. The disclosure particularly relates to a brake disk which has a friction portion, rubbed with brake pads, having proper hardness after quenching, excellent high temper softening resistance and toughness. The term "excellent in temper softening resistance" used herein means high temper softening resistance and also means such a feature that a reduction in hardness due to high temperature caused by friction heat during braking is small and initial proper hardness can be substantially maintained.

BACKGROUND

The functions of disc brakes for motorcycles, motorcars, bicycles, and the like are to slow the rotation of wheels by the friction between brake disks and brake pads to control the speed of vehicles. Therefore, the brake disks need to have proper hardness. There is a problem in that a low hardness of the brake disks reduces the braking performance and accelerates abrasion of disk because of the friction with brake pads and an extreme hardness thereof causes brake squeal. It is recommended that the proper hardness of the brake disks be within a range from 32 to 38 HRC. The term "HRC" used herein means the Rockwell C hardness specified in JIS Z 2245.

A material conventionally used for the brake disks is martensitic stainless steel in view of hardness and corrosion resistance. In the past, martensitic stainless steel, such as SUS 420J2 (JIS Z 4304), having a high carbon content was used for the disks after quenching and tempering treatment. Since the workload of tempering treatment is large, low-carbon martensitic stainless steel has been recently used for the brake disks as disclosed in Japanese Unexamined Patent Application Publication No. 57-198249 or 60-106951 because this steel can be used directly after quenching treatment.

In view of global environmental conservation, recent motorcycles and motorcars need to have high fuel efficiency. A reduction in vehicle weight is effective in achieving high fuel efficiency; hence, lightweight vehicles are demanded. Even disc brakes, which are a part of brake mechanism (or brake system), are no exception. For the weight reduction of vehicles, compact or low-thickness (thin) brake disks are being experimentally produced.

Compact or thin brake disks have low heat capacity. Hence, the temperature of the disks is greatly increased by friction heat during braking. That is, the compact or thin brake disks are probably heated to 600° C. or higher during braking. Brake disks made of conventional materials are probably reduced in durability by temper-softening. Therefore, brake disks that have high temper softening resistance or are excellent in temper softening resistance are demanded.

To cope with such a demand, the following sheet has been proposed as disclosed in Japanese Unexamined Patent Application Publication No. 2002-146489: a low-carbon martensitic stainless steel sheet which contains a proper amount of one or more of Ti, Nb, V, and Zr and which can be effectively prevented from being softened by heating during the use of a disc brake.

Japanese Patent 3315974 (Japanese Unexamined Patent Application Publication No. 2001-220654) discloses a stainless steel for disc brakes. The stainless steel contains a proper amount of Nb or a proper amount of Nb and Ti, V, and/or B and therefore can be prevented from being temper-softened.

Japanese Unexamined Patent Application Publication No. 2002-121656 discloses low-cost steel for disc brake rotors. The GP value of this steel is adjusted to 50(%) or more and this steel contains a proper amount of Nb and/or V, the GP value being determined by a function of the content of C, N, Ni, Cu, Mn, Cr, Si, Mo, V, Ti, and Al in this steel. This steel is hardly deteriorated by heating during operation.

In the technique disclosed in Japanese Unexamined Patent Application Publication No. 2002-146489, Japanese Patent 3315974, or Japanese Unexamined Patent Application Publication No. 2002-121656, there is a problem in that a relatively large amount of high-cost alloying elements need to be used and therefore the cost of manufacturing a disc brake is high. Furthermore, there is a problem in that the steel sheet or steel is significantly reduced in hardness after being held at 600° C. for a long time (about one hour). Disc brakes are critical components for driving safety and therefore need to have high toughness sufficient to prevent embrittlement cracking.

It could therefore be helpful to provide a brake disk which is effective in solving problems caused by the conventional techniques, which has proper hardness after quenching, and excellent temper softening resistance and toughness.

SUMMARY

We intensively investigated factors affecting the temper softening resistance of brake disks made from martensitic stainless steel sheets. As a result, we found that the following disk has proper hardness after quenching and markedly improved temper softening resistance: a brake disk that is made of a low-carbon martensitic stainless steel with a specific composition and has prior-austenite grains with a diameter of 8 μm or more.

FIG. 1 shows the influence of the average diameter of prior-austenite grains on the temper softening resistance of a low-carbon martensitic stainless steel containing, by mass, 0.055% of C, 0.1% of Si, 12% of Cr, 1.5% of Mn, and 0.01% of N, the remainder being Fe. Samples taken from this steel were quenched in such a manner that the samples were held at a temperature for one minute and then air-cooled (cooled to 200° C. at an average rate of 10° C./s).

The quenched samples were investigated for microstructure, whereby the average diameter of prior-austenite grains (hereinafter referred to as "prior-γ grains") in the samples was determined. The grains in the samples quenched at 1000° C., 1050° C., or 1100° C. had an average diameter of 6, 8, or 12 μm, respectively. The samples quenched at 1000° C. to 1100° C. at three levels were evaluated for temper softening resistance in such a manner that the quenched samples were held at 600° C. for one hour and then air-cooled, surface oxide layers (scale) were removed from the resulting samples, and the resulting samples were then measured for HRC hardness.

FIG. 1 illustrates that the samples containing the prior-austenite grains with an average diameter of 8 μm or more have a high hardness of 27 HRC or more after holding at 600° C. for one hour although the amount of the alloying elements in the samples is not large.

The mechanism of this phenomenon is not fully understood. Without being bound by any specific theory, we assume the mechanism to be as described below.

An alloying element, such as Cr, reaches grain boundaries by diffusion during tempering and forms coarse precipitates because such an alloying element readily precipitates. In a metal microstructure with fine prior-γ grains, the distance from an alloying element such as Cr to the boundaries of the prior-γ grains is short. Hence, such an alloying element as Cr readily reaches the prior-γ grain boundaries during tempering and forms coarse precipitates (chromium carbides). Therefore, there are only a small number of fine precipitates in the grains. The coarse precipitates have a small contribution to precipitation hardening and therefore are ineffective in increasing temper softening resistance.

In a metal microstructure with coarse prior-γ grains, the distance from an alloying element such as Cr or Nb to the boundaries of these prior-γ grains is long. Hence, such an alloying element as Cr or Nb is difficult to reach the prior-γ grain boundaries during tempering. Therefore, fine precipitates (chromium carbides, niobium carbides, and/or the like) are formed in these prior-γ grains. The fine precipitates resist dislocation motion and prevent the reduction of hardness after tempering. Therefore, the metal microstructure with the coarse prior-γ grains is supposed to have high temper softening resistance.

Furthermore, we found that prior-γ grains need to have an average diameter of less than 15 μm because an extreme increase in prior-γ grain diameter causes embrittlement.

We thus provide;
(1) A brake disk contains, by mass, 0.1% or less of C, 1.0% or less of Si, 2.0% or less of Mn, 10.5% to 15.0% of Cr, and 0.1% or less of N, the remainder being Fe and unavoidable impurities, such that the following inequalities are satisfied:

$$5Cr+10Si+15Mo+30Nb-9Ni-5Mn-3Cu-225N-270C<45 \quad (1)$$

$$0.03 \leq \{C+N-(13/92)Nb\} \leq 0.09 \quad (2)$$

wherein Cr, Si, Mo, Nb, Ni, Mn, Cu, N, and C each represent the content of the corresponding elements on a mass percent basis. The brake disk has a martensitic structure having prior-austenite grains with an average diameter of 8 to less than 15 μm and is excellent in temper softening resistance and toughness.

(2) The brake disk specified in Item (1) further contains 0.01% to less than 1.0% of Cu on a mass basis.

(3) The brake disk specified in Item (1) or (2) has a hardness of 27 HRC or more after tempering at 600° C. for one hour.

(4) The brake disk specified in Item (1) further contains 1.0% to 3.0% of Cu on a mass basis.

(5) The brake disk specified in Item (1) further contains 0.02% to 0.6% of Nb on a mass basis.

(6) In the brake disk specified in Item (5), the following inequality is satisfied:

$$0.5 < (\text{precipitated Nb/total Nb}) \leq 0.7 \quad (3)$$

wherein precipitated Nb and total Nb represent the amount of Nb precipitated in the form of precipitate and the amount of total Nb contained, respectively, on a mass percent basis.

(7) The brake disk specified in Item (5) or (6) further contains 0.01% to 0.5% of Cu on a mass basis.

(8) The brake disk specified in any one of Items (4) to (7) has a hardness of 30 HRC or more after tempering at 600° C. for one hour.

(9) The brake disk specified in any one of Items (1) to (8) further contains, by mass, one or both of 0.01% to 2.0% of Mo and 0.10% to 2.0% of Ni.

(10) The brake disk specified in any one of Items (1) to (9) further contains 0.01% to 1.0% of Co on a mass basis.

(11) The brake disk specified in any one of Items (1) to (10) further contains, by mass, one or more selected from 0.02% to 0.3% of Ti, 0.02% to 0.3% of V, 0.02% to 0.3% of Zr, and 0.02% to 0.3% of Ta.

(12) The brake disk specified in any one of Items (1) to (11) further contains, by mass, one or both of 0.0005% to 0.0050% of B and 0.0005% to 0.0050% of Ca.

The following disk can be produced at low cost by adjusting the diameter of prior-austenite grains to a proper range: a brake disk having a proper hardness after quenching of 32 to 38 HRC, high or excellent temper softening resistance, and excellent toughness. This is industrially important.

BRIEF DESCRIPTION OF DRAWINGS

FIG. 1 is a graph showing the influence of the average diameter of prior-austenite grains on temper softening resistance.

DETAILED DESCRIPTION

A representative procedure for producing a brake disk is as described below.

A martensitic stainless steel sheet is punched into a disk with a predetermined size. After the disk is machined to have holes for dissipating the heat generated by braking, a predetermined zone, that is, a friction portion of the disk that meets brake pads is quenched in such a manner that the friction portion is heated to a predetermined quenching temperature by high-frequency induction heating and then cooled, whereby the predetermined zone (friction portion) is transformed into a martensitic structure so as to have a desired hardness. Surfaces of the disk and/or a sheared surface thereof is subjected to coating as required and layers of oxides (scale) formed by quenching treatment are removed from the friction portion by grinding or the like, whereby a product (the brake disk) is obtained.

A low-carbon martensitic stainless steel sheet meeting specific conditions is used herein as a basic material. The low-carbon martensitic stainless steel sheet preferably contains, by mass, 0.1% or less of C, 1.0% or less of Si, 2.0% or less of Mn, 10.5% to 15.0% of Cr, and 0.1% or less of N and has a composition containing alloying elements such that the following inequalities are satisfied:

$$5Cr+10Si+15Mo+30Nb-9Ni-5Mn-3Cu-225N-270C<45 \quad (1)$$

$$0.03 \leq \{C+N-(13/92)Nb\} \leq 0.09 \quad (2)$$

wherein Cr, Si, Mo, Nb, Ni, Mn, Cu, N, and C each represent the content (in mass percent) of the corresponding alloying elements. The term "steel sheet" used herein includes a steel strip. A steel sheet used herein may be a hot-rolled or cold-rolled one.

The reason for limiting the composition of a basic material used herein is as described below. The unit "mass percent" used to describe the composition is hereinafter simply referred to as "%."

C: 0.1% or less

C, as well as N, is an element determining the hardness of the brake disk after quenching. The content of C is preferably 0.01% or more and more preferably 0.03% or more. When the C content is greater than 0.1%, coarse chromium carbides are formed, thereby causing rust, a reduction in corrosion resistance, and a reduction in toughness. In view of toughness and corrosion resistance, the C content is limited to 0.1% or less. In view of corrosion resistance, the C content is preferably less than 0.05%.

N: 0.1% or less

N, as well as C, is an element determining the hardness of the brake disk after quenching. N forms fine chromium nitrides ($Cr_2N$) at a temperature of 500° C. to 700° C. and is effective in increasing temper softening resistance because of the precipitation hardening effect thereof. To achieve this effect, the content of N is preferably greater than 0.03%. An N content exceeding 0.1% causes a reduction in toughness. Therefore, the content of N is herein limited to 0.1% or less.

Cr: 10.5% to 15.0%

Cr is an element useful in increasing the corrosion resistance of stainless steel. To secure sufficient corrosion resistance, the content of Cr needs to be 10.5% or more. However, a Cr content exceeding 15.0% causes a reduction in workability and toughness. Therefore, the content of Cr is limited to a range from 10.5% to 15.0%. In view of corrosion resistance and toughness, the content of Cr is preferably greater than 11.5% and 13.5% or less, respectively.

Si: 1.0% or less

Si is a useful element functioning as a deoxidizer and therefore the content of Si is preferably 0.05% or more. Since Si stabilizes a ferrite phase, an excessive Si content exceeding 1.0% causes a reduction in hardenability, hardness after quenching, and toughness. Therefore, the content of Si is limited to 1.0% or less. In view of toughness, the content of Si is preferably 0.5% or less.

Mn: 2.0% or less

Mn is an element that is useful in securing constant hardness after quenching because Mn prevents a δ-ferrite phase from being formed at high temperature to enhance hardenability. The content of Mn in the basic material is preferably 0.3% or more. However, an excessive Mn content exceeding 2.0% causes a reduction in corrosion resistance. Therefore, the content of Mn is limited to 2.0% or less. In view of an increase in hardenability, the content of Mn is preferably 1.0% or more and more preferably 1.5% or more.

The above fundamental components are contained within the above ranges such that the following inequalities are satisfied:

$$5Cr+10Si+15Mo+30Nb-9Ni-5Mn-3Cu-225N-270C<45 \quad (1)$$

$$0.03 \leq \{C+N-(13/92)Nb\} \leq 0.09 \quad (2)$$

wherein Cr, Si, Mo, Nb, Ni, Mn, Cu, N, and C each represent the content (in mass percent) of the corresponding alloying elements. The left-hand side value of Inequality (1) and the middle term value of Inequality (2) are calculated on the basis that the content of Cu, Nb, Mo, or Ni are assumed to be zero when the content of Cu, Nb, Mo or Ni less than 0.01%, less than 0.02%, less than 0.01%, and less than 0.10%, respectively.

Inequality (1) defines a condition for securing excellent hardening stability. The term "excellent hardening stability" used herein means that the range of a quenching temperature achieved a desired hardness after quenching is wide. The wide range is caused when the amount of an austenite (γ) phase formed during quenching is 75 volume % or more and the austenite phase is transformed into a martensite phase during cooling for quenching by air-cooling or cooling at a rate faster than air-cooling. When the left-hand side value of Inequality (1) is 45 or more, a constant hardness after quenching cannot be achieved because the amount of an austenite phase formed during quenching does not exceed 75 volume percent or a temperature range forming such an amount of the austenite phase is extremely narrow. Therefore, the left-hand side value of Inequality (1) is limited to less than 45.

Inequality (2) defines a condition for controlling hardness after quenching within a predetermined proper range. Hardness after quenching strongly correlates with the content of C or N. However, C or N has no contribution to hardness after quenching when C or N is bonded with Nb to form Nb carbide or Nb nitride. Therefore, hardness after quenching needs to be estimated using the amount of C or N obtained by subtracting the amounts of C and N consumed by the formation of precipitates from the amounts of C and N in steel. When the middle term value of Inequality (2) is less than 0.03, the hardness of the brake disk is less than the lower limit (32 HRC) of a predetermined proper range. When the middle term value is greater than 0.09, the hardness is greater than the upper limit (38 HRC) thereof. Therefore, the middle term value of Inequality (2) is limited to a range from 0.03 to 0.09.

In the basic material used herein, the content of P, that of S, and that of Al are preferably controlled to be 0.04% or less, 0.010% or less, and 0.2% or less, respectively in addition to the requirement that the content of each fundamental component is controlled within the above range.

P: 0.04% or less

P is an element causing a reduction in hot workability; hence, the content of P is preferably small. An excessive reduction in the P content leads to a significant increase in production cost. Therefore, the upper limit of the P content is preferably 0.04%. In view of productivity, the P content is more preferably 0.03% or less.

S: 0.010% or less

S, as well as P, is an element causing a reduction in hot workability. Hence, the content of S is preferably small. An excessive reduction in the S content leads to a significant increase in production cost. Therefore, the upper limit of the S content is preferably 0.010%. In view of productivity, the S content is more preferably 0.005% or less.

Al: 0.2% or less

Al is an element functioning as a deoxidizer and is used for deoxidization in steel making. An excessive amount of Al remaining in steel as an unavoidable impurity causes a reduction in corrosion resistance and toughness. Therefore, the content of Al is preferably limited to 0.2% or less. In view of corrosion resistance, the Al content is more preferably 0.05% or less.

In view of corrosion resistance, the basic material may further contain 0.01% to less than 1.0% of Cu in addition to the above fundamental components such that Inequalities (1) and (2) are satisfied.

Cu: 0.01% to less than 1.0%

Cu is an element having an effect of improving corrosion resistance. Hence, the content is preferably 0.01% to less than 1.0% such that such an effect can be achieved. In view of toughness, the content thereof is more preferably less than 0.5%. When both Cu and Nb are contained, the content of Cu is preferably limited to a range from 0.01% to 0.5% because a Cu content exceeding 0.5% causes a reduction in toughness.

A brake disk having high temper softening resistance can be produced in such a manner that the basic material is allowed to have a composition within a specific range by adding selective components below to the above fundamental components, a friction portion rubbed with brake pads is quenched as described below such that a martensitic structure having prior-γ grains with an average diameter of 8 to less than 15 μm is obtained. The brake disk has a hardness of 27 HRC or more after tempering at 600° C. for one hour.

Average diameter of prior-γ grains: 8 to less than 15 μm

To allow a brake disk, tempered at 600° C. or higher for one hour, to have a hardness of 27 HRC or more, prior-γ grains need to have an average diameter of 8 μm or more. When the prior-γ grains have an average diameter of less than 8 μm, the amount of fine precipitates in the prior-γ grains is small and therefore the increase in temper softening resistance is small. When the prior-γ grains have an average diameter of 15 μm or more, the facet sizes of brittle fracture surfaces are large. This leads to a reduction in toughness.

In addition to the above fundamental components, 1.0% to 3.0% of Cu and/or 0.02% to 0.6% of Nb may be contained such that Inequalities (1) and (2) are satisfied. This is effective in producing a brake disk that has a hardness of 30 HRC or more after tempering.

Cu: 1.0% to 3.0%

When the content of Cu is 1.0% or more, fine ε-Cu precipitates are formed by tempering. Hence, Cu is an temper softening resistance. Therefore, Cu may be contained as required. A Cu content exceeding 3.0% causes a reduction in toughness. Therefore, for the purpose of an increase in temper softening resistance, the content of Cu is preferably limited to a range from 1.0% to 3.0%.

Nb: 0.02% to 0.6%

Nb is an element that has an effect of preventing hardness from being reduced by high-temperature heating, that is, an effect of improving temper softening resistance, because Nb forms a carbonitride during heating at about 600° C. subsequently to quenching and cause precipitation hardening. Therefore, Nb may be contained as required. To achieve such an effect, the content of Nb is preferably 0.02% or more. However, an Nb content exceeding 0.6% causes a reduction in toughness. Therefore, the content of Nb is preferably limited to a range from 0.02% to 0.6%. In view of temper softening resistance, the content thereof is preferably greater than 0.08%. In view of toughness, the content thereof is preferably less than 0.3%.

The amount of Nb as precipitates and the amount of total Nb contained are preferably adjusted such that the following inequality is satisfied:

$$0.5 < (\text{precipitated Nb}/\text{total Nb}) \leq 0.7 \quad (3)$$

wherein precipitated Nb and total Nb represent the amount of Nb precipitated in the form of precipitate and the amount of total Nb contained, respectively, on a mass percent basis. In a steel sheet unquenched (after annealing), the ratio (precipitated Nb/total Nb) is 0.9 or more. A portion of precipitated Nb forms a solid solution after quenching. Solute Nb forms fine precipitates during tempering. This leads to precipitation hardening. When Inequality (3) is not satisfied, that is, when the ratio (precipitated Nb/total Nb) is greater than 0.7, the amount of the solute Nb is small and therefore the amount of the fine Nb precipitates formed during tempering is small. This leads to a reduction in temper softening resistance. To allow the ratio (precipitated Nb/total Nb) to be 0.7 or less, high-temperature quenching is preferably performed at higher than 1000° C., more preferably higher than 1050° C., and further more preferably higher than 1100° C.

When the ratio (precipitated Nb/total Nb) is less than 0.5, the amount of the solute Nb is extremely large and therefore the amount of the fine Nb precipitates formed during tempering is extremely large. This leads to an increase in temper softening resistance. Furthermore, the amount of the precipitates, which cause fracture, is extremely large. This leads to a remarkable reduction in toughness. The amount of precipitated Nb is determined by chemically analyzing the residue of electrolytic extraction from a brake disk sample. The amount of total Nb is determined by ordinary chemical analysis.

One or both of 0.01% to 2.0% of Mo and 0.10% to 2.0% of Ni may be contained as required in addition to the fundamental components and the selective components such that Inequalities (1) and (2) are satisfied.

One or both of 0.01% to 2.0% of Mo and 0.10% to 2.0% of Ni

Mo and Ni are elements improving corrosion resistance and therefore may be selectively contained. Ni retards the precipitation of chromium carbides at a temperature of 600° C. or more to prevent the reduction in the hardness of a martensitic structure and has a contribution to an increase in temper softening resistance. Mo, as well as Ni, retards the precipitation of carbonitrides and has an effect of increasing temper softening resistance. Such effects are achieved when the content of Mo is 0.01% or more or the content of Ni is 0.10% or more. In view of temper softening resistance, the content of Mo is preferably 0.02% or more. Even if the content of Mo or Ni exceeds 2.0%, an advantage appropriate to the content of Mo or Ni cannot be obtained because the increase in temper softening resistance is saturated. This is economically disadvantageous. Therefore, the content of Mo is preferably limited to a range from 0.01% to 2.0% and the content of Ni is preferably limited to a range from 0.10% to 2.0%. Even if the content of Mo is less than 0.05%, an effect of increasing temper softening resistance can be achieved. When the content of Ni 0.5% or more, temper softening resistance is increased.

Co, one or more selected from Ti, V, Zr, and Ta, and one or both of B and Ca may be contained as required in addition to the fundamental components and the selective components.

Co: 0.01% to 1.0%

Co is an element effective in increasing corrosion resistance. The content of Co is preferably 0.01% or more. A Co content exceeding 1.0% causes a reduction in toughness. Therefore, the content of Co is preferably limited to a range from 0.01% to 1.0%. In view of toughness, the content thereof is preferably 0.3% or less.

One or more selected from 0.02% to 0.3% of Ti, 0.02% to 0.3% of V, 0.02% to 0.3% of Zr, and 0.02% to 0.3% of Ta Ti, V, Zr, and Ta are elements which form carbonitrides and which have an effect of increasing temper softening resistance by precipitation hardening. One or more of these elements may be contained as required. Such an effect is remarkable when the content of Ti, V, Zr, or Ta is 0.02% or more respectively. In particular, V has a significant effect of increasing temper softening resistance. Hence, the content of V is preferably 0.05% or more and more preferably 0.10% or more. A content of Ti, V, Zr, or Ta is exceeding 0.3% causes a significant reduction in toughness. Therefore, the content of Ti, V, Zr or Ta is preferably limited to a range from 0.02% to 0.3% respectively.

One or both of 0.0005% to 0.0050% of B and 0.0005% to 0.0050% of Ca

B and Ca are elements that have an effect of increasing the hardenability of steel even if their contents are slight. Therefore, B and/or Ca may be selectively contained as required. Such an effect can be achieved when the content of B or Ca is 0.0005% or more respectively. However, a B or Ca content exceeding 0.0050% causes a reduction in corrosion resistance. Therefore, the content of B or Ca is preferably limited to a range from 0.0005% to 0.0050% respectively.

The remainder other than the above components is Fe and unavoidable impurities. Examples of the unavoidable impurities include alkali metals such as Na, alkaline-earth metals such as Mg and Ba, rare-earth elements such as Y and La, and transition elements such as Hf. Advantages are not reduced even if 0.05% or less of the each unavoidable impurity is contained respectively.

A method for producing the brake disk material, which has the above composition, is not particularly limited. The brake disk material can be produced by a known process. For example, molten steel having the above composition is melted in a steel converter, an electric furnace, or the like; subjected to secondary refining process such as VOD (vacuum oxygen decarburization) or AOD (argon oxygen decarburization); and then formed into a ingot or a slab by a known casting process. In view of producibility and quality, a continuous casting process is preferable.

It is preferable that the steel is heated to a temperature of 1100° C. to 1250° C. and then hot-rolled into a sheet with a predetermined thickness. For disc brake use, the hot-rolled steel sheet preferably has a thickness of 3 to 8 mm. The hot-rolled steel sheet is annealed and then descaled by shot blast or pickling as required, whereby the steel sheet, which is used for brake disks, is obtained. The hot-rolled steel sheet is preferably held at a temperature of higher than 750° C. to 900° C. for about ten hours in a batch-type box furnace. The annealed steel sheet has a hardness of 75 to 88 HRB (Rockwell B hardness) suitable for brake disks and therefore used for brake disks.

The steel sheet is machined into a disk by punching or the like. A predetermined zone (a friction portion rubbed with brake pads) of the disk is quenched, whereby a brake disk is obtained. The quenching treatment is carried out in such a manner that a quenching temperature is a temperature of higher than 1000° C. within a γ region and a cooling rate is 1° C./s or more.

The quenching temperature is preferably set a temperature within a γ region, particularly a temperature exceeding 1000° C. The term "γ region" used herein means a region of temperature in which an austenite (γ) phase occupies 75 volume percent or more in the steel. When the quenching temperature is higher than 1000° C., the brake disk has proper hardness after quenching and has a martensitic structure having prior-γ grains with an average diameter of 8 μm or more. Hence, the brake disk is prevented from being reduced in hardness after being held at high temperature as described above, that is, the brake disk has remarkably improved temper softening resistance. When the quenching temperature is 1000° C. or lower, the predetermined zone has remarkably reduced hardness after being held at high temperature. In view of temper softening resistance, the quenching temperature is preferably higher than 1050° C. and more preferably higher than 1100° C.

When the quenching temperature is higher than 1200° C., a large amount of δ-ferrite is formed and therefore the austenite (γ) phase is not formed by 75 volume percent or more in some cases and the prior-γ grains may have an average diameter of 15 μm or more because an increase in temperature accelerates the growth of grains. Therefore, the quenching temperature is preferably 1200° C. or less. In view of hardenability, the quenching temperature is preferably 1150° C. or less.

To sufficiently transform ferrite into austenite, the holding time during the quenching treatment is preferably 30 s or more.

After being heated, the disk is cooled to an Ms point (martensitic transformation starting temperature) or less at a rate of 1° C./s or more and preferably to 200° C. or less. When the cooling rate thereof is less than 1° C./s, a portion of the austenite phase formed at a quenching temperature is transformed into a ferrite phase and therefore the amount of a martensite phase is decreased. Hence, the disk cannot have proper hardness after quenching. The cooling rate thereof is preferably 5 to 500° C./s. To achieve constant quenching hardness, the cooling rate thereof is preferably 100° C./s or more.

The brake disk obtained as described above is excellent in temper softening resistance and toughness. It has a composition of low-carbon martensitic stainless steel. The friction portion rubbed with brake pads has a martensitic structure having prior-γ grains with an average diameter of 8 to less than 15 μm. The brake disk is excellent in temper softening resistance and toughness. A heating technique for quenching is not particularly limited and high-frequency induction heating is preferable in view of producibility.

Our brake disks will now be further described in detail with reference to examples.

EXAMPLES

Molten steels having compositions shown in Table 1 were produced in a high-frequency melting furnace and then cast into ingots. The ingots were hot-rolled into hot-rolled steel sheets (a thickness of 5 mm). The hot-rolled steel sheets were annealed in such a manner that the hot-rolled steel sheets were heated at 800° C. for eight hours in a reducing gas atmosphere and then gradually cooled. The resulting hot-rolled steel sheets descaled by pickling, whereby brake disk materials were prepared.

Specimens (size: 5×30 mm×30 mm) were taken from the brake disk materials. The specimens were heated at quenching temperatures (a holding time of one minute) and then cooled at rates shown in Table 2. Samples were taken from the quenched specimens. The samples were observed for metal microstructure, measured for the amount of precipitated Nb, and subjected to a hardening stability test, a temper softening resistance test, and a toughness test after tempering. Testing procedures were as described below.

(1) Observation of Metal Microstructure

A sample for metal microstructure observation was taken from each quenched specimen. A cross-section of the sample that was parallel to the hot-rolling direction and the thickness direction was polished and then etched with an Murakami reagent alkaline solution of red prussiate (10 g of a red prussiate, 10 g of caustic potassium (potassium hydrate), and 100 cc of water), whereby boundaries of prior-γ grains were exposed. Five or more fields (one field: 0.2 mm×0.2 mm) were observed with an optical microscope (a magnification of 400 times). The grains contained in each field of view were measured for area with an image analysis device, whereby the equivalent circle diameters of the grains were determined. The equivalent circle diameters of the grains were averaged, whereby the average diameter of the prior-γ grains of the sample was determined.

(2) Measurement of Amount of Precipitated Nb

A sample for electrolytic extraction was taken from each quenched specimen. The sample was subjected to electrolysis using a 10 v/v percent acetylacetone-1 w/v percent tetramethylammonium chloride-methanol electrolyte (AA type). A residue was extracted from the electrolyte using a filter. The extracted residue was measured for the amount of Nb by inductively coupled plasma emission spectrometry, whereby the amount of precipitated Nb present in the form of precipitates was determined.

(3) Hardening Stability Test

Each quenched sample was descaled by pickling and then measured for surface hardness HRC at five points with a Rockwell hardness meter according to JIS Z 2245. The obtained measurements were averaged, whereby the hardness after quenching was determined.

(4) Temper Softening Resistance Test

Each quenched sample was tempered (heated, held, and then air-cooled) under conditions shown in Table 2. The tempered sample was descaled by pickling and then measured for surface hardness HRC at five points with a Rockwell hardness meter according to JIS Z 2245. The obtained measurements were averaged, whereby the sample was evaluated for temper softening resistance.

(5) Toughness Test after Tempering

Each sample was quenched and then tempered as shown in Table 2. The resulting sample was descaled by pickling and then cut into five V-notch test pieces (a width of 5 mm, subsize) according to JIS Z 2202. The test pieces were subjected to a Charpy impact test according to JIS Z 2242, whereby the test pieces were measured for Charpy impact at a test temperature of 25° C. The values of the five test pieces were averaged. When the average was 50 J/cm² or more, the toughness of the sample was evaluated to be not problematic for practical use.

The obtained results were summarized in Table 2.

The maximum temperature of γ-regions shown in Table 2 refers to a maximum temperature at which an austenite (γ) phase is formed by 75 volume percent or more. At a temperature higher than the maximum temperature, a δ phase (ferrite phase) is increased and therefore the γ phase cannot be formed by 75 volume percent or more.

TABLE 1

| Steel No. | Chemical components (mass percent) | | | | | | | | | | | | | Left side value of Inequality (1) | Middle term value of Inequality (2) | Remarks |
|---|---|---|---|---|---|---|---|---|---|---|---|---|---|---|---|---|
| | C | Si | Mn | P | S | Al | Cr | N | Nb | Cu | Mo | Ni | Others | | | |
| 1A | 0.044 | 0.23 | 1.54 | 0.03 | 0.003 | 0.002 | 12.12 | 0.022 | — | — | — | — | — | 38.4 | 0.066 | Example |
| 1B | 0.023 | 0.33 | 1.52 | 0.02 | 0.004 | 0.004 | 12.33 | 0.036 | — | — | — | — | — | 43.0 | 0.059 | Example |
| 1C | 0.041 | 0.08 | 1.52 | 0.02 | 0.005 | 0.003 | 12.31 | 0.035 | — | — | — | — | V: 0.04 | 35.8 | 0.076 | Example |
| 1D | 0.040 | 0.27 | 1.55 | 0.03 | 0.005 | 0.003 | 12.20 | 0.038 | — | — | 0.01 | 0.13 | — | 35.6 | 0.078 | Example |
| 1E | 0.039 | 0.33 | 0.80 | 0.02 | 0.005 | 0.002 | 11.82 | 0.036 | — | 0.83 | — | 0.15 | V: 0.08 | 35.9 | 0.075 | Example |
| 1F | 0.052 | 0.28 | 1.40 | 0.02 | 0.003 | 0.003 | 12.40 | 0.021 | — | 0.60 | — | — | — | 37.2 | 0.073 | Example |
| 1G | 0.043 | 0.23 | 1.34 | 0.02 | 0.002 | 0.023 | 13.43 | 0.008 | — | 2.55 | — | — | — | 41.7 | 0.051 | Example |
| 1H | 0.042 | 0.15 | 1.45 | 0.02 | 0.003 | 0.003 | 12.22 | 0.048 | 0.13 | — | — | — | — | 37.1 | 0.072 | Example |
| 1I | 0.041 | 0.86 | 1.43 | 0.02 | 0.004 | 0.003 | 10.68 | 0.036 | — | — | — | — | Co: 0.13 | 35.7 | 0.077 | Example |
| 1J | 0.041 | 0.26 | 1.84 | 0.02 | 0.004 | 0.005 | 12.18 | 0.036 | — | — | — | — | B: 0.0025 | 35.1 | 0.077 | Example |
| 1K | 0.042 | 0.33 | 1.45 | 0.03 | 0.003 | 0.003 | 12.33 | 0.044 | 0.23 | — | — | 0.16 | — | 41.9 | 0.054 | Example |
| 1L | 0.082 | 0.18 | 1.08 | 0.03 | 0.005 | 0.003 | 11.85 | 0.039 | 0.45 | 0.33 | — | — | — | 37.2 | 0.058 | Example |
| 1M | 0.040 | 0.12 | 1.55 | 0.03 | 0.008 | 0.003 | 13.85 | 0.048 | 0.15 | 0.43 | 0.04 | 0.69 | — | 38.7 | 0.067 | Example |
| 1N | 0.044 | 0.03 | 1.33 | 0.03 | 0.004 | 0.033 | 12.22 | 0.036 | 0.06 | — | 0.41 | 0.42 | Ca: 0.0015, Co: 0.15 | 38.9 | 0.072 | Example |
| 1O | 0.051 | 0.31 | 0.78 | 0.02 | 0.005 | 0.003 | 12.45 | 0.015 | 0.04 | 0.33 | 0.03 | 0.56 | Ti: 0.15 | 39.9 | 0.060 | Example |
| 1P | 0.052 | 0.29 | 1.56 | 0.03 | 0.003 | 0.003 | 12.22 | 0.011 | — | — | — | 0.13 | V: 0.05 | 38.5 | 0.063 | Example |
| 1Q | 0.044 | 0.27 | 1.50 | 0.02 | 0.004 | 0.002 | 12.17 | 0.040 | 0.13 | — | — | 0.23 | V: 0.13 | 37.0 | 0.066 | Example |
| 1R | 0.043 | 0.25 | 1.53 | 0.02 | 0.003 | 0.003 | 12.15 | 0.041 | 0.13* | 0.72* | — | 0.12 | V: 0.14 | 35.4 | 0.066 | Comparative example |
| 1S | 0.034 | 0.24 | 0.33 | 0.03 | 0.003 | 0.005 | 12.44 | 0.035 | — | — | — | 0.13 | — | 44.7 | 0.069 | Comparative example |
| 1T | 0.015 | 0.11 | 1.88 | 0.03 | 0.003 | 0.005 | 11.80 | 0.009 | — | 0.35 | — | — | V: 0.09 | 43.6 | 0.024 | Comparative example |
| 1U | 0.055 | 0.21 | 0.43 | 0.02 | 0.004 | 0.003 | 12.33 | 0.055 | 0.10 | — | 0.38 | 0.17 | — | 41.5 | 0.096 | Comparative example |

*A Cu content of 0.05% or less is within the scope of the present invention when Nb is contained.

TABLE 2

| Test material No. | Steel No. | Maximum temperature of γ-regions (° C.) | Quenching treatment | | Hardening stability | | Microstructure Average diameter of prior-γ grains (μm) | Precipitated Nb/ total Nb | Tempering treatment | | Temper softening resistance Hardness after tempering (HRC) | Toughness after tempering Charpy impact value (J/cm²) | Remarks |
|---|---|---|---|---|---|---|---|---|---|---|---|---|---|
| | | | Quenching temperature (° C.) | Cooling rate** (° C./s) | Hardness after quenching HRC | Evaluation* | | | Holding temperature (° C.) | Holding time (h) | | | |
| 1 | 1A | 1170 | 950 | 10 | 34 | ○Superior | 5 | — | 600 | 2 | 22 | 115 | Comparative example |
| 2 | | | 1000 | 10 | 35 | ○Superior | 7 | — | 600 | 2 | 23 | 111 | Comparative example |
| 3 | | | 1050 | 10 | 35 | ○Superior | 8 | — | 600 | 2 | 27 | 101 | Example |
| 4 | | | 1100 | 10 | 35 | ○Superior | 11 | — | 600 | 2 | 27 | 90 | Example |
| 5 | | | 1150 | 10 | 34 | ○Superior | 12 | — | 600 | 2 | 28 | 86 | Example |
| 6 | | | 1200 | 10 | 30 | ×Inferior | 14 | — | 600 | 2 | 24 | 82 | Comparative example |
| 7 | 1B | 1150 | 1000 | 10 | 35 | ○Superior | 5 | — | 600 | 1 | 23 | 115 | Comparative example |
| 8 | | | 1050 | 10 | 35 | ○Superior | 9 | — | 600 | 1 | 27 | 105 | Example |

TABLE 2-continued

| Test material No. | Steel No. | Quenching Maximum temperature of γ-regions (° C.) | Quenching treatment Quenching temperature (° C.) | Cooling rate** (° C./s) | Hardening stability Hardness after quenching HRC | Evaluation* | Microstructure Average diameter of prior-γ grains (μm) | Precipitated Nb/ total Nb | Tempering treatment Holding temperature (° C.) | Holding time (h) | Temper softening resistance Hardness after tempering (HRC) | Toughness after tempering Charpy impact value (J/cm$^2$) | Remarks |
|---|---|---|---|---|---|---|---|---|---|---|---|---|---|
| 9 | | | 1100 | 10 | 35 | oSuperior | 11 | — | 600 | 1 | 28 | 88 | Example |
| 10 | | | 1150 | 10 | 33 | oSuperior | 12 | — | 600 | 1 | 27 | 85 | Example |
| 11 | | | 1180 | 10 | 30 | xInferior | 13 | — | 600 | 1 | 24 | 83 | Comparative example |
| 12 | 1C | 1170 | 1000 | 200 | 37 | oSuperior | 6 | — | 600 | 2 | 24 | 110 | Comparative example |
| 13 | | | 1050 | 200 | 37 | oSuperior | 8 | — | 600 | 2 | 29 | 98 | Example |
| 14 | | | 1150 | 200 | 36 | oSuperior | 13 | — | 600 | 2 | 30 | 82 | Example |
| 15 | | | 1200 | 200 | 31 | xInferior | 14 | — | 600 | 2 | 25 | 78 | Comparative example |
| 16 | 1D | 1170 | 1000 | 100 | 37 | oSuperior | 5 | — | 600 | 2 | 26 | 120 | Comparative example |
| 17 | | | 1030 | 100 | 37 | oSuperior | 8 | — | 600 | 2 | 28 | 109 | Example |
| 18 | | | 1100 | 100 | 37 | oSuperior | 12 | — | 600 | 2 | 29 | 95 | Example |
| 19 | | | 1150 | 100 | 37 | oSuperior | 14 | — | 600 | 2 | 30 | 92 | Example |
| 20 | 1E | 1170 | 1000 | 10 | 36 | oSuperior | 7 | — | 600 | 1 | 25 | 110 | Comparative example |
| 21 | | | 1050 | 10 | 36 | oSuperior | 9 | — | 600 | 1 | 29 | 99 | Example |
| 22 | | | 1170 | 10 | 36 | oSuperior | 13 | — | 600 | 1 | 30 | 85 | Example |
| 23 | | | 1200 | 10 | 31 | xInferior | 14 | — | 600 | 1 | 25 | 78 | Comparative example |
| 24 | 1F | 1170 | 1000 | 10 | 36 | oSuperior | 6 | — | 600 | 1 | 23 | 111 | Comparative example |
| 25 | | | 1050 | 10 | 36 | oSuperior | 8 | — | 600 | 1 | 27 | 95 | Example |
| 26 | | | 1150 | 10 | 36 | oSuperior | 13 | — | 600 | 1 | 28 | 89 | Example |
| 27 | | | 1250 | 10 | 35 | oSuperior | 25 | — | 600 | 1 | 26 | 28 | Comparative example |

*Samples with a hardness after quenching of 32 to 38 HRC were evaluated to be superior (o) and the others were evaluated to be inferior (x).
**Average cooling rate down to 200° C.

TABLE 3

| Test material No. | Steel No. | Quenching Maximum temperature of γ-regions (° C.) | Quenching treatment Quenching temperature (° C.) | Cooling rate** (° C./s) | Hardening stability Hardness after quenching HRC | Evaluation* | Microstructure Average diameter of prior-γ grains (μm) | Precipitated Nb/ total Nb | Tempering treatment Holding temperature (° C.) | Holding time (h) | Temper softening resistance Hardness after tempering (HRC) | Toughness after tempering Charpy impact value (J/cm$^2$) | Remarks |
|---|---|---|---|---|---|---|---|---|---|---|---|---|---|
| 28 | 1G | 1150 | 1000 | 5 | 33 | oSuperior | 5 | — | 600 | 1 | 25 | 91 | Comparative example |
| 29 | | | 1050 | 5 | 33 | oSuperior | 8 | — | 600 | 1 | 30 | 82 | Example |
| 30 | | | 1150 | 5 | 32 | oSuperior | 12 | — | 600 | 1 | 31 | 66 | Example |
| 31 | | | 1200 | 5 | 30 | xInferior | 14 | — | 600 | 1 | 25 | 60 | Comparative example |
| 32 | 1H | 1200 | 1000 | 5 | 36 | oSuperior | 5 | 0.82 | 600 | 2 | 25 | 112 | Comparative example |
| 33 | | | 1050 | 5 | 36 | oSuperior | 8 | 0.73 | 600 | 2 | 30 | 105 | Example |
| 34-1 | | | 1150 | 5 | 36 | oSuperior | 12 | 0.61 | 600 | 2 | 31 | 87 | Example |
| 34-2 | | | 1200 | 5 | 35 | oSuperior | 14 | 0.55 | 600 | 2 | 31 | 75 | Example |
| 35 | | | 1230 | 5 | 31 | xInferior | 20 | 0.37 | 600 | 2 | 26 | 27 | Comparative example |
| 36 | 1I | 1170 | 1000 | 10 | 36 | oSuperior | 6 | — | 600 | 1 | 23 | 115 | Comparative example |
| 37 | | | 1050 | 10 | 36 | oSuperior | 8 | — | 600 | 1 | 27 | 99 | Example |
| 38 | | | 1100 | 10 | 36 | oSuperior | 11 | — | 600 | 1 | 27 | 92 | Example |
| 39 | | | 1150 | 0.1 | 31 | xInferior | 13 | — | 600 | 1 | 25 | 65 | Comparative example |
| 40 | | | 1150 | 10 | 36 | oSuperior | 13 | — | 600 | 1 | 28 | 84 | Example |
| 41 | 1J | 1170 | 1000 | 10 | 37 | oSuperior | 5 | — | 600 | 2 | 23 | 108 | Comparative example |
| 42 | | | 1050 | 10 | 37 | oSuperior | 9 | — | 600 | 2 | 27 | 105 | Example |

TABLE 3-continued

| Test material No. | Steel No. | Maximum temperature of γ-regions (° C.) | Quenching treatment Quenching temperature (° C.) | Cooling rate** (° C./s) | Hardening Hardness after quenching HRC | stability Evaluation* | Microstructure Average diameter of prior-γ grains (μm) | Precipitated Nb/ total Nb | Tempering treatment Holding temperature (° C.) | Holding time (h) | Temper softening resistance Hardness after tempering (HRC) | Toughness after tempering Charpy impact value (J/cm²) | Remarks |
|---|---|---|---|---|---|---|---|---|---|---|---|---|---|
| 43 |  |  | 1170 | 10 | 36 | oSuperior | 14 | — | 600 | 2 | 28 | 81 | Example |
| 44 | 1K | 1170 | 1000 | 10 | 33 | oSuperior | 4 | 0.85 | 600 | 2 | 25 | 105 | Comparative example |
| 45 |  |  | 1150 | 10 | 32 | oSuperior | 12 | 0.58 | 600 | 2 | 31 | 80 | Example |
| 46 | 1L | 1230 | 1000 | 10 | 35 | oSuperior | 4 | 0.81 | 600 | 5 | 25 | 92 | Comparative example |
| 47 |  |  | 1100 | 10 | 35 | oSuperior | 10 | 0.68 | 600 | 5 | 30 | 70 | Example |
| 48 |  |  | 1150 | 10 | 35 | oSuperior | 12 | 0.61 | 600 | 5 | 31 | 64 | Example |
| 49 |  |  | 1220 | 10 | 34 | oSuperior | 18 | 0.56 | 600 | 5 | 31 | 29 | Comparative example |
| 50 | 1M | 1200 | 1000 | 10 | 35 | oSuperior | 4 | 0.79 | 600 | 1 | 26 | 88 | Comparative example |
| 51 |  |  | 1150 | 10 | 35 | oSuperior | 12 | 0.60 | 600 | 1 | 33 | 60 | Example |
| 52 |  |  | 1230 | 10 | 31 | xInferior | 21 | 0.35 | 600 | 1 | 26 | 22 | Comparative example |

*Samples with a hardness after quenching of 32 to 38 HRC were evaluated to be superior (o) and the others were evaluated to be inferior (x).
**Average cooling rate down to 200° C..

TABLE 4

| Test material No. | Steel No. | Maximum temperature of γ-regions (° C.) | Hardening Quenching temperature (° C.) | Cooling rate** (° C./s) | Hardness after quenching HRC | stability Evaluation* | Microstructure Average diameter of prior-γ grains (μm) | Precipitated Nb/ total Nb | Tempering treatment Holding temperature (° C.) | Holding time (h) | Temper softening resistance Hardness after tempering (HRC) | Toughness after tempering Charpy impact value (J/cm²) | Remarks |
|---|---|---|---|---|---|---|---|---|---|---|---|---|---|
| 53 | 1N | 1200 | 1000 | 1 | 34 | oSuperior | 5 | 0.85 | 600 | 1 | 26 | 102 | Comparative example |
| 54 |  |  | 1150 | 1 | 34 | oSuperior | 12 | 0.62 | 600 | 1 | 33 | 90 | Example |
| 55 | 1O | 1200 | 1000 | 10 | 35 | oSuperior | 5 | 0.79 | 600 | 1 | 26 | 80 | Comparative example |
| 56 |  |  | 1150 | 10 | 35 | oSuperior | 13 | 0.59 | 600 | 1 | 33 | 69 | Example |
| 57 | 1P | 1170 | 1000 | 10 | 35 | oSuperior | 7 | — | 600 | 2 | 24 | 115 | Comparative example |
| 58 |  |  | 1050 | 10 | 35 | oSuperior | 8 | — | 600 | 2 | 29 | 99 | Example |
| 59 |  |  | 1100 | 10 | 35 | oSuperior | 11 | — | 600 | 2 | 29 | 88 | Example |
| 60 |  |  | 1150 | 10 | 35 | oSuperior | 13 | — | 600 | 2 | 30 | 81 | Example |
| 61 | 1Q | 1200 | 1000 | 10 | 35 | oSuperior | 5 | 0.80 | 600 | 10 | 26 | 108 | Comparative example |
| 62 |  |  | 1100 | 10 | 35 | oSuperior | 11 | 0.66 | 600 | 10 | 32 | 91 | Example |
| 63-1 |  |  | 1150 | 10 | 35 | oSuperior | 13 | 0.61 | 600 | 10 | 33 | 88 | Example |
| 63-2 |  |  | 1200 | 10 | 35 | oSuperior | 14 | 0.56 | 600 | 10 | 33 | 73 | Example |
| 64 | 1R | 1200 | 1150 | 10 | 35 | oSuperior | 13 | 0.62 | 600 | 2 | 33 | 20 | Comparative example |
| 65 | 1S | 1050 | 1000 | 10 | 32 | oSuperior | 7 | — | 600 | 1 | 22 | 113 | Comparative example |
| 66 |  |  | 1050 | 10 | 32 | oSuperior | 8 | — | 600 | 1 | 26 | 108 | Comparative example |
| 67 |  |  | 1100 | 10 | 31 | xInferior | 11 | — | 600 | 1 | 26 | 85 | Comparative example |
| 68 | 1T | 1150 | 1000 | 10 | 31 | xInferior | 6 | — | 600 | 1 | 21 | 121 | Comparative example |
| 69 |  |  | 1100 | 10 | 31 | xInferior | 11 | — | 600 | 1 | 24 | 101 | Comparative example |
| 70 |  |  | 1150 | 10 | 30 | xInferior | 13 | — | 600 | 1 | 25 | 95 | Comparative example |
| 71 |  |  | 1200 | 10 | 27 | xInferior | 14 | — | 600 | 1 | 21 | 89 | Comparative example |
| 72 | 1U | 1170 | 1000 | 10 | 41 | xInferior | 7 | 0.78 | 600 | 1 | 32 | 103 | Comparative example |

TABLE 4-continued

| Test material No. | Steel No. | Maximum temperature of γ-regions (° C.) | Hardening Quenching temperature (° C.) | Cooling rate** (° C./s) | Hardening stability Hardness after quenching HRC | Evaluation* | Microstructure Average diameter of prior-γ grains (µm) | Precipitated Nb/ total Nb | Tempering treatment Holding temperature (° C.) | Holding time (h) | Temper softening resistance Hardness after tempering (HRC) | Toughness after tempering Charpy impact value (J/cm²) | Remarks |
|---|---|---|---|---|---|---|---|---|---|---|---|---|---|
| 73 | | 1100 | 10 | 41 | xInferior | | 11 | 0.69 | 600 | 1 | 35 | 83 | Comparative example |
| 74 | | 1150 | 10 | 40 | xInferior | | 13 | 0.60 | 600 | 1 | 35 | 79 | Comparative example |
| 75 | | 1230 | 10 | 32 | oSuperior | | 20 | 0.33 | 600 | 1 | 25 | 18 | Comparative example |

*Samples with a hardness after quenching of 32 to 38 HRC were evaluated to be superior (o) and the others were evaluated to be inferior (x).
**Average Cooling rate down to 200° C..

The Examples have a hardness after quenching of 32 to 38 HRC and also have excellent hardening stability, excellent temper softening resistance, and excellent toughness. The Comparative Examples have a hardness after quenching that is outside a range from 32 to 38 HRC or have low temper softening resistance or low toughness. Comparative Examples having prior-γ grains with an average diameter have low and unsatisfactory hardness after tempering.

INDUSTRIAL APPLICABILITY

The following disk can be produced at low cost by adjusting the diameter of prior-austenite grains to a proper range: a brake disk having a proper hardness after quenching of 32 to 38 HRC, high or excellent temper softening resistance, and excellent toughness. This is industrially important.

The invention claimed is:

1. A brake disk excellent in temper softening resistance and toughness comprising, by mass, 0.1% or less of C, 1.0% or less of Si, 2.0% or less of Mn, 10.5% to 15.0% of Cr, 0.02% to 0.6% of Nb, 0.01 to 0.43% of Cu, 0.0005% to 0.0050% of B, 0.1% or less of N, and not containing Mo and Ni, the remainder being Fe and unavoidable impurities, such that the following inequalities are satisfied:

$$5Cr+10Si+30Nb-5Mn-3Cu-225N-270C<45 \quad (1)$$

$$0.03 \leq \{C+N-(13/92)Nb\} \leq 0.09 \quad (2)$$

wherein a ratio of precipitated Nb to total Nb is greater than 0.5 and less than or equal to 0.7 and precipitated Nb and total Nb represent an amount of Nb precipitated in the form of precipitate and the amount of total Nb contained, respectively, on a mass percent basis,
Cr, Si, Nb, Mn, Cu, N, and C each represent the content of the corresponding elements on a mass percent basis, and having a martensitic structure having prior-austenite gains with an average diameter of 8 to less than 15 µm, and
the brake disk has a hardness of 27 HRC or more after tempering at 600° C. for one hour and a Charpy impact value of 50 J/cm² or more at a test temperature of 25° C. after tempering at 600° C. for one hour.

2. The brake disk according to claim 1, having a hardness of 30 HRC or more after tempering at 600° C. for one hour.

3. The brake disk according to claim 1, further comprising 0.01% to 1.0% of Co on a mass basis.

4. The brake disk according to claim 1, further comprising, by mass, one or more selected from 0.02% to 0.3% of Ti, 0.02% to 0.3% of V, 0.02% to 0.3% of Zr, and 0.02% to 0.3% of Ta.

5. The brake disk according to claim 1, further comprising, by mass, 0.0005% to 0.0050% of Ca.

\* \* \* \* \*